United States Patent
Becheret

(10) Patent No.: US 9,464,916 B2
(45) Date of Patent: Oct. 11, 2016

(54) METHOD OF CALIBRATING AN INERTIAL ASSEMBLY COMPRISING A DYNAMIC PHASE BETWEEN TWO STATIC PHASES

(75) Inventor: Yves Becheret, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 108 days.

(21) Appl. No.: 14/117,596

(22) PCT Filed: May 15, 2012

(86) PCT No.: PCT/EP2012/059049
§ 371 (c)(1),
(2), (4) Date: Nov. 13, 2013

(87) PCT Pub. No.: WO2012/159939
PCT Pub. Date: Nov. 29, 2012

(65) Prior Publication Data
US 2014/0298883 A1 Oct. 9, 2014

(30) Foreign Application Priority Data
May 20, 2011 (FR) ...................................... 11 01564

(51) Int. Cl.
*G01P 21/00* (2006.01)
*G01P 15/18* (2013.01)
*G01C 25/00* (2006.01)

(52) U.S. Cl.
CPC ............. *G01C 25/00* (2013.01); *G01C 25/005* (2013.01); *G01P 21/00* (2013.01)

(58) Field of Classification Search
CPC ..... G01C 25/005; G01C 25/00; G01P 21/00; G01P 15/18
See application file for complete search history.

(56) References Cited

U.S. PATENT DOCUMENTS

| 6,823,279 B1 * | 11/2004 | Nadkarni et al. ............. 702/104 |
| 9,091,539 B2 * | 7/2015 | Hanson .................. G01C 19/00 |

(Continued)

FOREIGN PATENT DOCUMENTS

| EP | 0717264 A2 | 6/1996 |
| FR | 725598 A * | 5/1932 |

(Continued)

OTHER PUBLICATIONS

Thérèse Huet, Cours de Physique Générale : Mécanique du point (General Physics Course : Point Mechanics), 2005.*

(Continued)

*Primary Examiner* — David A Rogers
(74) *Attorney, Agent, or Firm* — Muncy, Geissler, Olds & Lowe, P.C.

(57) ABSTRACT

A method of calibrating an inertial unit is provided. During a first static stage, in which the inertial unit is in a first orientation, measurements are taken by means of the accelerometers and the inertial rotation sensors. During a dynamic stage, the orientation of the inertial unit is changed, at least in part in azimuth, from the first orientation towards a second orientation, while taking measurements by means of the inertial rotation sensors. During a second static stage, in which the inertial unit is in the second position, measurements are taken by means of the accelerometers and of the inertial rotation sensors. For each static stage, a direction, an amplitude, and a mean speed of rotation for apparent gravity in an inertial frame of reference is estimated, variation is calculated in orientation between the static stages, and the accelerometer biases is deduced therefrom.

5 Claims, 1 Drawing Sheet

(56) References Cited

U.S. PATENT DOCUMENTS

| | | | |
|---|---|---|---|
| 2006/0260398 A1* | 11/2006 | Umeda | G01N 3/30 73/489 |
| 2008/0177492 A1* | 7/2008 | Woodmansee et al. | 702/95 |
| 2008/0288200 A1* | 11/2008 | Noble | A61B 5/1116 702/96 |
| 2009/0013755 A1* | 1/2009 | Tsai et al. | 73/1.38 |
| 2009/0182521 A1* | 7/2009 | Sill | G01D 18/00 702/104 |
| 2010/0192662 A1* | 8/2010 | Yanni | 73/1.38 |
| 2011/0264393 A1* | 10/2011 | An et al. | 702/104 |
| 2011/0301901 A1* | 12/2011 | Panagas | 702/104 |
| 2011/0301902 A1* | 12/2011 | Panagas | 702/104 |
| 2012/0203487 A1* | 8/2012 | Johnson et al. | 702/104 |
| 2012/0215477 A1* | 8/2012 | Tuck et al. | 702/99 |
| 2013/0124127 A1* | 5/2013 | Ahuja et al. | 702/86 |
| 2014/0245810 A1* | 9/2014 | Stirling et al. | 73/1.79 |
| 2014/0352400 A1* | 12/2014 | Barrilado et al. | 73/1.38 |

FOREIGN PATENT DOCUMENTS

| | | | |
|---|---|---|---|
| FR | 848899 A | * | 11/1939 |
| FR | 2915569 A1 | | 10/2008 |

OTHER PUBLICATIONS

W.T. Fong et al., "Methods for in-field user calibration of an inertial measurement unit without external equipment," Meas. Sci. Technol., vol. 19, No. 8, Aug. 1, 2008, pp. 1-10, IOP Publ.

L. Sahawneh, et al., "Development and calibration of low cost MEMS IMU for UAV applications," 5$^{th}$ International Symposium on Mechatronics and Its Applications (ISMA08), Amman, Jordan, May 27-29, 2008, pp. 1-9.

G. Panahandeh et al., "Calibration of the Accelerometer Triad of an Inertial Measurement Unit, Maximum Likelihood Estimation and Cramér-Rao Bound," International Conference on Indoor Positioning and Indoor Navigation (IPIN), Zurich, Switzerland, Sep. 15-17, 2010, pp. 1-6.

T. Nieminen, et al., "An enhanced multi-position calibration method for consumer-grade inertial measurement units applied and tested," Meas. Sci. Technol., vol. 21, No. 10, Aug. 13, 2010, pp. 1-11.

Z.F. Syed et al., "A new multi-position calibration method for MEMS inertial navigation systems," Meas. Sci. Technol., vol. 18, No. 7, Jul 1, 2007, pp. 1897-1907.

* cited by examiner

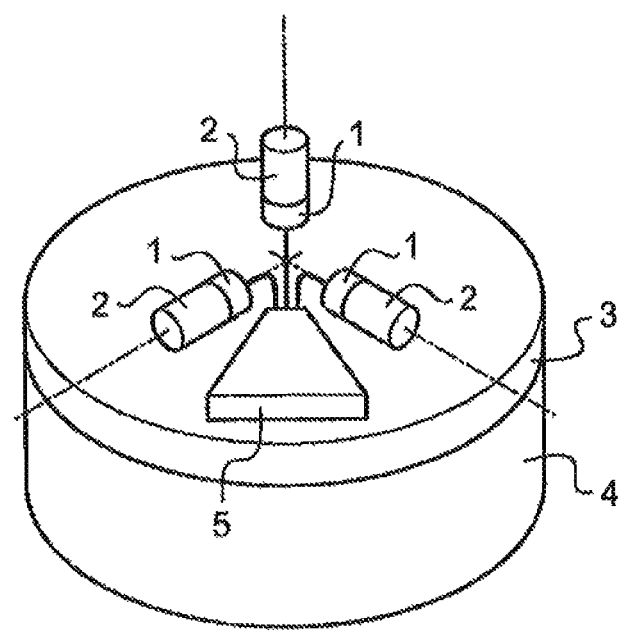

METHOD OF CALIBRATING AN INERTIAL ASSEMBLY COMPRISING A DYNAMIC PHASE BETWEEN TWO STATIC PHASES

BACKGROUND OF THE INVENTION

1. Field of the Invention

The present invention relates to a method of calibrating an inertial unit having accelerometers and angle sensors.

2. Brief Discussion of the Related Art

In general, an inertial unit has three accelerometers and three angle sensors of the gyro type mounted on a frame. The accelerometers and the angle sensors have axes that are substantially in alignment with the axes of a measurement frame of reference and they are connected to a control unit that serves to acquire measurement signals from the accelerometers and the angle sensors and to process them, at least in part.

Accelerometers and sensors present defects, such as biases and drifts, and it is necessary to know them in order to take them into account when processing the measurement signals so as to improve the accuracy of the inertial unit.

For this purpose, it is common practice to calibrate the inertial unit before using it.

Calibration seeks to make it possible to estimate some or all of the biases and drifts and to determine a set of parameters for processing the measurement signals so as to make it possible to minimize these biases and drifts, in full or in part. Calibration is particularly useful for correcting errors associated with accelerometer biases since they are practically constant over short periods of use.

Various calibration methods exist.

The most widespread method consists in aligning the sensing axes of the accelerometers and of the angle sensors in succession on the vertical in order to cause each accelerometer to measure the acceleration due to apparent gravity, and to deduce a sensor error therefrom.

That extremely simple calibration technique is nevertheless not possible when the inertial unit is mounted on a support that does not allow for the various orientations needed for performing the calibration.

Another method consists in using a reference inertial unit that is maintained in the same position as the inertial unit for calibration and in determining the set of processing parameters that enables the inertial unit for calibration to deliver measurements that are as close as possible to those delivered by the reference inertial unit.

The set of processing parameters is selected to minimize at least some of the errors of the inertial unit for calibration, however it is affected by errors of the reference inertial unit and by errors in positioning the reference inertial unit relative to the inertial unit for calibration.

SUMMARY OF THE INVENTION

An object of the invention is to propose calibration means that are simple while enabling good performance to be achieved.

To this end, the invention provides a method of calibrating an inertial unit having accelerometers and angle sensors, the method comprising the steps of:

during a first static stage, in which the inertial unit is in a first position, taking measurements by means of the accelerometers and the angle sensors;

during a dynamic stage, moving the inertial unit, at least in part in azimuth, from the first position towards a second position, while taking measurements by means of the angle sensors;

during a second static stage in which the inertial unit is in the second position, taking measurements by means of the accelerometers and of the angle sensors; and for each static stage estimating a direction, an amplitude, and a mean speed of rotation for apparent gravity ("pesanteur vulgaire" in French) in an inertial frame of reference, calculating variation in position between the static stages, and deducing therefrom the accelerometer biases.

Calibration is thus performed quickly without having recourse to an external reference for attitude or for force.

Other characteristics and advantages of the invention appear on reading the following description of a particular, non-limiting implementation of the invention.

BRIEF DESCRIPTION OF THE DRAWINGS

Reference is made to the sole accompanying FIGURE, which is a diagrammatic perspective view of an inertial unit enabling a calibration method in accordance with the invention to be performed.

DETAILED DESCRIPTION OF THE PREFERRED EMBODIMENTS

In known manner, the inertial unit comprises three accelerometers 1 and three angle sensors 2 of the gyro type, mounted on a frame 3 carried by a steerable support 4, specifically a tripod, enabling the frame to be pivoted about a first axis that is substantially in alignment with the vertical (azimuth pivoting) and includes orientation means enabling the first axis to be moved angularly to a limited extent about the vertical. The accelerometers and the angle sensors have axes substantially in alignment on the axes X, Y, Z of a measurement frame of reference and they are connected to a control unit 5.

The control unit 5 has calculation means, such as a microprocessor, and a memory containing a control and processing program to be executed by the calculation means.

The control and processing program is arranged in known manner to acquire measurement signals from the accelerometers 1 and the angle sensors 2, and to perform at least some processing thereon.

The control and processing program is also arranged to perform a calibration method for determining a set of processing parameters for use by said program when processing the measurement signals. The calibration method in accordance with the invention seeks to determine the set of processing parameters so as to minimize the biases of the accelerometers 1, and it may be associated with another calibration method seeking to minimize other errors, in particular other errors of the accelerometers and/or errors of the angle sensors, or errors of the system for acquiring and processing the measurement signals.

The method of the invention comprises the following steps:

during a first static stage, in which the inertial unit is in a first orientation, taking measurements by means of the accelerometers and the inertial rotation sensors;

during a dynamic stage, moving the inertial unit, at least in part in azimuth, from the first orientation towards a second orientation, while taking measurements by means of the inertial rotation sensors; and during a second static stage, in which the inertial unit is in the second position, taking measurements by means of the accelerometers and the inertial rotation sensors.

The movement during the dynamic stage in this example is a rotation about the first axis. The rotation needs to be fast enough for the attitude error of the accelerometers to be affected little by the biases of the inertial rotation sensors.

The control unit 5 then processes the measurement signals in order to estimate, for each of the static stages, a direction, an amplitude, and a mean speed of rotation for apparent gravity in an inertial frame of reference. This is done in conventional manner by integrating the measurement signals coming from the accelerometers 1 during each of the static stages. Variation in orientation between the static stages is also calculated by integrating the measurement signals coming from the angle sensors 2 during the dynamic stage. The biases of the accelerometers 1 are then deduced on the basis of the previously performed estimates and calculations. The measurement signals are integrated in conventional manner by digital processing after sampling the signals, with integration applying to the value of the signal portion at each time step (commonly referred to as speed increment or angle increment, depending on where the measurement signal comes from).

The biases of the accelerometers are determined by the least squares method in order to minimize the movements measured during the static stages. Because of the accelerometer biases, it is possible, and even probable, that the measurement signals produced by the accelerometers during the static stages are representative of movement even though the inertial unit was substantially stationary. Estimating the biases makes it possible to determine a set of processing parameters such that, using these processing parameters, the control unit 5 can correct said measurement signals so that they correspond to no movement.

This implementation is particularly advantageous since it is robust and not greedy for resources (it does not require all inertial navigation calculations to be performed).

According to an advantageous characteristic of the invention, the control unit is programmed so that, as soon as it is activated, it launches calibration immediately after detecting a pair of static stages that are separated by a rotation of sufficient magnitude and speed.

The static stages may be detected by means of measurement signals coming from the accelerometers and the inertial rotation sensors, or from signals from a detector that is secured to the support, e.g. handles for handling the support, in order to detect when said support is grasped by an operator (and might therefore be handled).

At the end of calibration, provision may be made for:
automatically taking account of the estimated biases (and calculating sets of parameters); or
informing the operator that the biases have been estimated and proposing that they be taken directly into account by the control unit 5 or that their values be transferred to a data processor or storage device connected to the control unit 5. The inertial unit may also be coupled to another three-dimensional position-location device that is capable of making use of the data provided by the control unit or that is capable of providing the control unit 5 with data that the control unit 5 can use to improve the accuracy of the inertial unit.

In a variant, provision may be made for calibration to be launched by the operator. The control unit 5 then preferably includes a display for guiding the operator in running the static and dynamic stages. When the support includes a brake device or a blocking device for maintaining a position, it is possible to use the information concerning activation of the brake or blocking device for the purpose of detecting a static stage.

Also in a variant, measurements may be taken by means of the accelerometers during the dynamic stage.

Also in a variant, it is possible to reduce the sensitivity of the estimation to movements during the static stages. The accelerometer biases are determined by the least squares method in order to minimize the movements measured during the static stages of a point secured to the inertial unit while taking account of a known lever arm between the inertial unit and a stationary point, e.g. the center of the hinge that enables the support to be oriented.

The variation in orientation between the static stages is then calculated by integrating the measurement signals coming from the inertial rotation sensors 2 and from the accelerometers 1 during the dynamic stage. By way of example, this is done by means of a Kalman filter. This makes it possible to estimate the biases, and also at least some of the mean drifts of the angle sensors, thereby improving the accuracy of calibration. Best performance has been obtained when movement during the static stage does not take place in a horizontal plane. If the movement is excessively horizontal, the processor unit is programmed to ignore drifts. This variant implementation also presents the advantage of not needing to inform the program from outside the system about the beginnings and the ends of the static stages.

In another variant, it is possible to improve the accuracy of calibration by taking account of the latitude, the altitude, and the position of the navigation point of the inertial unit relative to the hinge point about which the inertial unit is pivotally mounted. For example, knowledge of latitude makes it possible to compensate for the rotation of the earth during the dynamic stage and thus to reduce errors in estimating the biases in the event of the drifts of the angle sensors giving rise to greater speed error than the ramps of the accelerometer biases.

In a variant, it is possible to provide an estimate of the three drifts of the inertial unit when the rotation in the moving stage is about an axis that is far enough away from the vertical and if the duration of the static stages is sufficient for obtaining the desired accuracy of estimation.

Preferably, during the static stages, the processing program is arranged to tolerate movements in translation of one to a few centimeters and movements in rotation of several milliradians, of magnitudes that are variable depending on the accuracy needed.

Naturally, the invention is not limited to the implementation described, but covers any variant coming within the ambit of the invention as defined by the claims.

The invention claimed is:
1. A method of calibrating accelerometers of an inertial unit having also inertial rotation sensors, comprising the following steps:
during a first static stage, in which the inertial unit is in a first orientation, taking measurements by means of the accelerometers and the inertial rotation sensors;
during a dynamic stage, changing the orientation of the inertial unit, at least in part in azimuth, from the first orientation towards a second orientation, while taking measurements by means of the inertial rotation sensors;
during a second static stage, in which the inertial unit is in the second position, taking measurements by means of the accelerometers and of the inertial rotation sensors; and estimating a direction, an amplitude, and a mean speed of rotation for apparent gravity in an inertial frame of reference for each static stage, calculating variation in orientation between the static stages during the dynamic stage, and deducing therefrom the accelerometer biases.

2. The method according to claim 1, wherein the accelerometer biases are determined by the least squares method jointly with the initially determined first orientation in such a manner as to minimize the movements measured during the static stages.

3. The method according to claim 1, wherein the measurements are performed by means of the accelerometers during the dynamic stage.

4. The method according to claim 1, wherein the method is launched automatically after detecting a pair of static stages.

5. The method according to claim 1, comprising the step of deducing from the calculated variation, if the rotation in the intermediate stage makes this possible, the drifts.

* * * * *